Feb. 23, 1937.     R. L. BROWN     2,071,329
METHOD OF RECOVERING PHTHALIC ANHYDRIDE
Filed Aug. 22, 1935
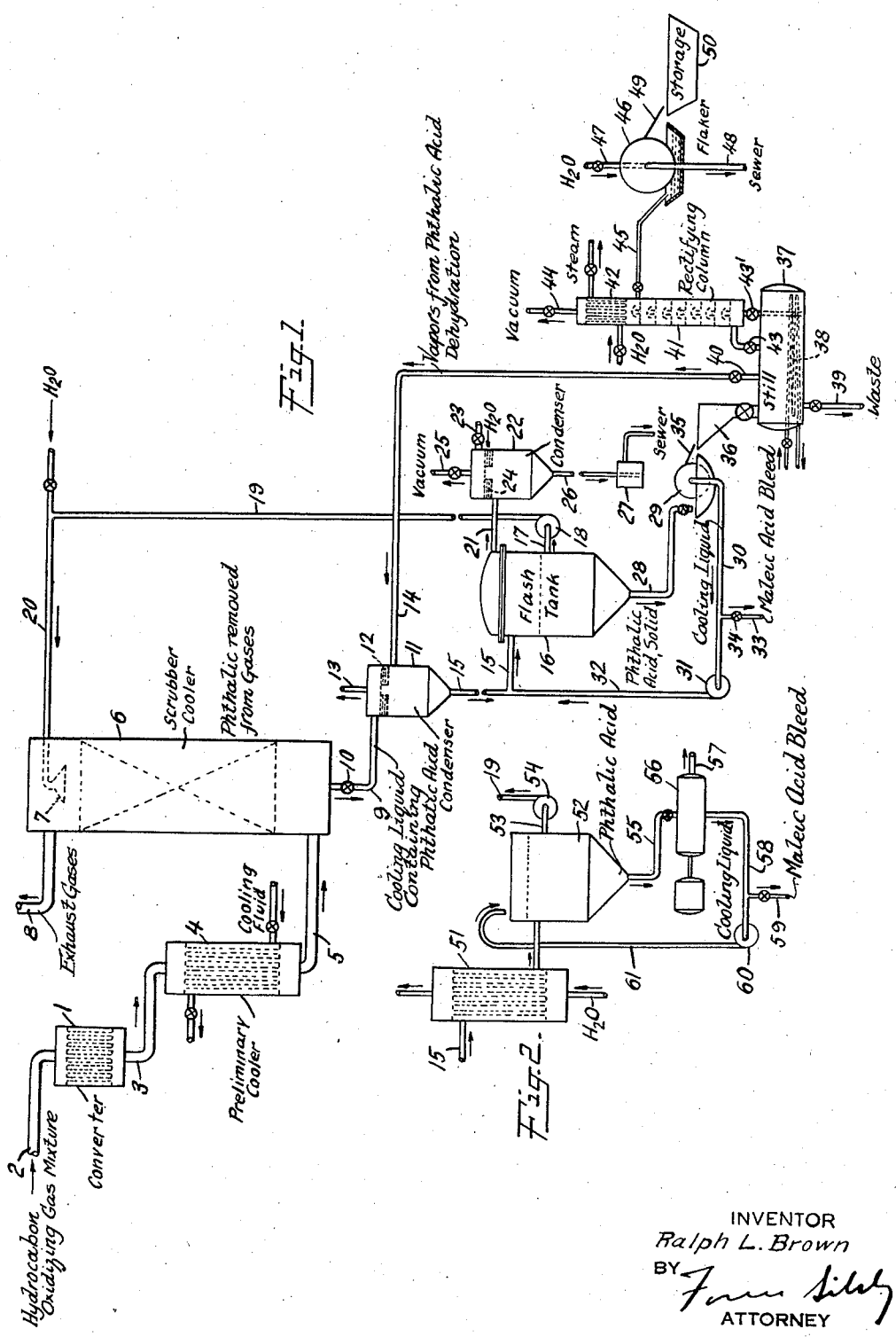
INVENTOR
Ralph L. Brown
BY
ATTORNEY Patented Feb. 23, 1937

2,071,329

UNITED STATES PATENT OFFICE 2,071,329

METHOD OF RECOVERING PHTHALIC ANHYDRIDE

Ralph Lyman Brown, Syracuse, N. Y., assignor to The Solvay Process Company, New York, N. Y., a corporation of New York Application August 22, 1935, Serial No. 37,373

14 Claims. (Cl. 260—123)

This application relates to recovery of phthalic and maleic anhydrides and acids from the hot reaction gases resulting from the vapor phase oxidation of polynuclear aromatic compounds, e. g. naphthalene, anthracene, and their homologues and naphtho-quinone.

The separation of phthalic anhydride and maleic anhydride from such reaction gases, as exemplified in the process for the catalytic oxidation of naphthalene by means of air, is normally effected by first cooling the gases, by indirect heat exchange with air or other suitable cooling medium or in some cases by the direct addition of cold air, to lower the temperature of the gases sufficiently to condense out the phthalic anhydride. Most, if not all of the maleic anhydride remains in the gases in vapor phase during the condensation and accordingly the gases are usually scrubbed with some suitable scrubbing medium to remove this product.

The gases may come from the oxidation chamber or converter at a temperature of 400° to 500° C. and when operating at atmospheric pressure phthalic anhydride begins to condense out in solid phase from the gases at around 130° C. This condensation results in the formation of solid phthalic anhydride accumulations which adhere to the walls of the cooling chamber and require periodic or continuous scraping to effect their removal.

The adhesion of phthalic anhydride to the walls of the cooling chamber presents an always annoying and sometimes serious, problem. Condensation of the phthalic anhydride under elevated pressure may present greater difficulties than condensation at atmospheric pressure because the dew-point of phthalic anhydride may be raised considerably above its melting point and a part of the product may be condensed out of the gases as a liquid which upon further cooling tends to adhere with considerable tenacity to the walls of the condenser. Separation of these accumulations of phthalic anhydride may be effected mechanical or manually. Mechanical removal requires relatively complicated apparatus and a correspondingly high initial investment as well as high upkeep costs for power consumption. Manual removal on the other hand requires access to the interior of the condenser, and because of the irritating character of the organic anhydrides upon mucous membranes, presents a serious danger to workmen engaged in their removal. Furthermore, the escape of anhydride vapors into the atmosphere during the process presents a considerable hazard to other persons engaged in working in and around the plant.

It is an object of the present invention to overcome these various difficulties without the disadvantages attending prior proposals.

The process of the present invention is especially applicable to catalytic oxidation systems operating under elevated pressure, say a pressure above about two atmospheres, wherein removal of phthalic anhydride by the normally employed procedures is rendered commercially impracticable.

In accordance with the present invention the hot reaction gases containing phthalic anhydride as the main condensable constituent are passed, while yet at a temperature above that at which phthalic anhydride condenses in solid phase, into a cooling chamber wherein they are brought into direct and intimate contact with cooling water which simultaneously cools the gases and separates both phthalic anhydride and maleic anhydride therefrom. The phthalic anhydride is hydrated to phthalic acid by this process. The temperature and quantity of cooling water may be regulated so that the phthalic acid is removed from the gases either entirely in solution or mainly as a slurry or as both solution and slurry.

Preferably the water is contacted with the hot phthalic anhydride-containing gases under such controlled conditions that the water is not highly heated. The cooler wherein hot phthalic anhydride-containing gases are brought into direct contact with water, may be of any suitable construction to provide thorough contact between the cooling liquid and the hot reaction gases. For example, it may be a chamber or tower, which may be substantially devoid of packing and provided with spray devices such as spray heads, rotating rolls, discs, or other mechanical agitators arranged for spraying liquid into the gases and against the surfaces of the chamber to vigorously wash the surfaces and prevent adhesion of solid matter thereto, or the cooler may be a simple vessel or tank in which the hot gases bubble up through the liquid therein; submerged packing, screens, or other devices for breaking up the gas stream into a large number of smaller streams or bubbles may be provided. A bubble cap scrubber of the type commonly employed as distillation columns may be used or a scrubber in which the gas is treated with liquid flowing in the same direction as the gas through tubes, nozzles, or the like and the resultant mixture is then passed through a gas liquid separator, may be employed.

The phthalic anhydride-containing gases, prior to contact with cooling water, may be precooled to a temperature above that at which a solid phthalic anhydride is formed, say above about 135° C. By maintaining the precooler under suitable pressure, a portion of the phthalic acid may be recovered in liquid phase prior to the direct contact cooling step if desired. Alternatively the cooling may be effected entirely in a single step.

Although the scrubbing of the gases with water may be effected at normal, higher, or lower pressures with good results, it is advantageous to effect the scrubbing at a substantially elevated pressure, say 2 to 5 atmospheres. When such elevated pressures are employed, they may be obtained merely by introducing the gases into the system at a relatively high pressure and avoiding unnecessary pressure drops through the system. Thus the converter may be operated at an inlet pressure of around 3 atmospheres or higher so that the scrubber will operate at above 2 atmospheres pressure.

By carrying out the process in accordance with the present invention, the phthalic anhydride in the gases is substantially completely removed by the scrubbing and cooling action of the water. Whether the phthalic acid is contained mainly as slurry or as solution in the effluent scrubbing liquid, it is advantageous to cool the liquid prior to removal of the phthalic acid. In this manner most of the phthalic acid contained in dissolved form will be precipitated. The slurry of solid phthalic acid then may be treated to separate the solid from the liquid of this slurry. Separation may be effected, for example, by filtration or by decantation, either centrifugal or gravitational. The phthalic acid thus obtained may be distilled fractionally to remove water and form phthalic anhydride. In this manner a phthalic anhydride of high quality is obtained.

Cooling of the gases by direct contact with water not only eliminates phthalic anhydride therefrom but further carries off substantially all of the maleic anhydride present in the gases in the form of maleic acid solution. In view of the comparatively small quantity of maleic acid present and its relatively high solubility, this product is retained in solution and hence is separated from the solid phthalic acid during the filtration or decantation process. Part of the maleic acid in solution may be bled off and make-up water added at a sufficient rate to maintain the maleic acid concentration of the resultant solution below that of saturation at the temperature at which phthalic acid is removed and the liquor may then be used for condensing additional phthalic anhydride. The maleic acid liquor bled off may be treated for recovery of maleic acid and any dissolved phthalic acid or may be otherwise disposed of.

In order that a better understanding of the process of my invention may be had, the following illustration is given with particular reference to the accompanying drawing, wherein Fig. 1 shows schematically one embodiment thereof and Fig. 2 shows an alternative arrangement of cooling and separation system.

In the drawing the numeral 1 designates a catalytic converter having an inlet conduit 2 and an outlet conduit 3 which leads to the top of a preliminary cooler 4. From the bottom of cooler 4 a conduit 5 leads to a scrubber and cooler 6 at a point near the bottom thereof. The scrubber and cooler 6 may be of any suitable construction to provide thorough contact between an aqueous cooling liquid and hot reaction gases; for example, it may be a tower provided with a spray head 7 and substantially devoid of packing, or it may be a chamber provided with mechanical agitators such as rotating rolls, discs, etc. for spraying the liquid into the gases, or a tower provided with suitable packing such as grids or Raschig rings. Gas outlet 8 is shown in the top of the tower for the passage of cooled gases therefrom. The outlet conduit 8 may lead to an apparatus for subsequent treatment of the gases or to suitable pumps for recompressing and recirculating a portion of the gases as previously discussed. In designing the cooling and scrubbing tower 6 for recovery of phthalic acid partly as a slurry, this fact should be borne in mind and the apparatus should be so designed as to avoid any clogging of the apparatus by the solid product.

At the bottom of tower 6 there is a suitable outlet pipe 9 provided with a valve 10. This valve may be operated to provide a constant level of liquid in the bottom of the tower 6 and automatic means (not shown) controlled by this level may be included for intermittently or continuously adjusting the valve 10 to permit passage of only the desired amount of liquid and solid. Outlet pipe 9 leads to the upper section of a condenser 11. This condenser has for its function the condensation of acid and water from the phthalic anhydride still and elimination of noncondensable gases from the scrubbing liquid as will be hereinafter more fully described. The condenser is shown with a shelf 12 in its upper portion arranged to support liquid and provide a cascade of liquid down through the condenser. The condenser is provided with a vapor outlet 13 and a vapor inlet pipe 14. At its bottom is a liquid outlet 15 leading to a flash tank 16.

Flash tank 16 is arranged for cooling the phthalic acid slurry by evaporation. It also serves as a settling chamber and decanter for removal of solid phthalic acid from the cooling medium. The flash tank is provided with an outlet pipe 17 leading to pump 18 for recirculation of decanted liquid through conduits 19 and 20 to the spray head 7. It also has a vapor outlet 21 leading to a vacuum condenser 22 equipped with a cooling water inlet 23, a suitable shelf 24 for cascading the cooling water therein, a vacuum connection 25, and a condensate and cooling fluid outlet 26 leading to a liquid seal 27 and thence to the sewer or other disposal.

The bottom of flash tank 16 slopes toward an outlet conduit 28 leading to a drum filter 29 for treating the concentrated slurry produced by the settling in flash tank 16 to separate solid phthalic acid from the aqueous solution. The liquid outlet 30 of the drum filter leads to a recirculating pump 31 for conveying residual liquid through pipes 32 and 15 back to flash tank 16. On the pipe 30 a bleed line 33 is provided having a valve 34 for regulating the continuous or intermittent withdrawal of residual liquid to avoid building up its maleic acid concentration as previously described. Doctor 35 of filter 29 discharges phthalic acid to hopper 36 of still 37.

The still 37 may be of any suitable construction for dehydration of phthalic acid. In the drawing is shown a still adapted to effect not only dehydration of phthalic acid but distillation and rectification of the resultant phthalic anhydride. At the bottom of the still 37 is a steam coil 38 for heating the contents of the still. Steam or other heating fluid may be employed for this purpose. A valved outlet 39 is provided for draining the contents from the still. A vapor pipe 14 having a valve 40 leads to condenser 11. For effecting distillation and rectification of phthalic anhydride, the still 37 is provided with a rectifying column 41 having a cooler 42 at the top thereof and suitable rectifying plates therein, for example, plates of the bell and tray type. Preferably column 41 is joined to the still 37 by a valved vapor connection 43 and liquid return 43' so that the column may be closed to distillation vapors during decomposition of phthalic acid and water resulting from the decomposition is prevented from entering the column and reacting later with phthalic anhydride therein to form phthalic acid. The top of the column has a vacuum connection 44 leading to evacuating means (not shown). Liquid draw-off 45 from the top plate of column 41 leads to the dip pan of a flaker 46. The flaking drum of flaker 46 has an inlet 47 and an outlet 48 for cooling fluid and is provided with a doctor 49 for scraping solid phthalic anhydride from the cooling drum as the drum rotates and for discharging it into a storage vessel 50.

The following example illustrates the method of operating the above recovery system in connection with the catalytic oxidation of naphthalene by means of air.

A mixture of naphthalene vapor and air in a molar or volume ratio at about 1:130 preheated to around 350° C., and at a pressure around 3 atmospheres absolute enters converter 1 containing a suitable oxidation catalyst such as vanadium oxide. In this converter the naphthalene is oxidized mainly to phthalic anhydride, some maleic anhydride being formed in the process.

The reaction gases at a temperature of 400° to 500° C. pass through conduit 3 to preliminary cooler 4 where their temperature is reduced by indirect heat exchange with a suitable cooling fluid, for example water, to about 200° C. The preliminary cooler advantageously may be a waste heat boiler wherein the cooling fluid is heated by the hot gases to generate steam. The steam pressure may be regulated so that the cooling fluid does not cause premature condensation of solid phthalic anhydride. The gases thus partially cooled pass through conduit 5 to tower 6, which they enter near the bottom thereof while yet at a pressure around 2 atmospheres, and pass upward countercurrent to a descending stream of cooling water introduced through inlet 20 and spray head 7. The entering cooling water may be at a temperature of around 20° to 40° C. and its volume is regulated so that the gases in their passage through the scrubbing tower are cooled down to about 25° to 40° C.

The cooled gases, freed from phthalic and maleic anhydrides, may be exhausted from the cooling tower through outlet conduit 8. The cooling and scrubbing liquid which collects at the bottom of tower 6, consists of a slurry of solid phthalic acid in water, substantially all of the maleic anhydride and a small portion of the phthalic anhydride content of the gases being present as a solution of maleic and phthalic acids in the cooling water.

The phthalic acid slurry passes off through outlet 9 at a temperature which may be around 40° C. or above and at a regulated rate controlled by valve 10 to prevent reduction of pressure in the scrubber. It enters condenser 11 near the top thereof and cascades off the edges of shelf 12 to the bottom of the condenser. Any gases absorbed by the liquid in scrubber 6 will be liberated and will pass off through outlet 13. The reduction of pressure to atmospheric also will effect some evaporation and cooling of the slurry. The liquid leaves the condenser 11 through pipe 15 and passes to the flash tank 16 where it is subjected to a reduction of pressure, say to onehalf pound per square inch absolute. In this manner a portion of the liquid is evaporated and the remainder is quickly cooled by the evaporation to a temperature around 20° to 40° C. The evaporated portion passes into condenser 22 where it is cooled and condensed by a cascade of cold water introduced at inlet 23. Since the evaporated portion of the liquid is water, it may be discharged through outlet 26 and liquid seal 27 to the sewer, or may be returned to the system as additional cooling fluid. During condensation vacuum is maintained by suction on vacuum connection 25. The unevaporated liquid remaining after the flashing step collects as a relatively quiet body in tank 16 and since the phthalic acid is more dense than the water solution, partial separation by decantation takes place. The liquid, free from solid phthalic acid, or substantially so, is returned by means of pump 18 and pipes 17, 19, and 20 to spray head 7.

The concentrated slurry settling to the bottom of flash tank 16 is withdrawn through outlet 28 to drum filter 29 where its moisture content is still further reduced. The solid phthalic acid, freed from water, passes off at 35 to bin 36. The liquid separated therefrom and containing any dissolved maleic acid and phthalic acid passes through pipe 30 to pump 31 and is returned to tank 16 via pipes 32 and 15.

As the process continues, the maleic acid content of the liquid will tend to increase and in order to prevent subsequent precipitation thereof along with phthalic acid, it is desirable to bleed off a small quantity of the solution through outlet 33, the amount being controlled by valve 34. The solution bled off may be replaced by introduction of additional cooling water through inlet pipe 20. The replacement of maleic acid solution by water also serves to keep the density of the solution low and hence improves the efficiency of separation in tank 16.

The phthalic acid still 37 is arranged for batch operation and functions in the following manner. When a suitable batch of phthalic acid has accumulated in bin 36, it is introduced into still 37. The still is heated to about 190° C. by passing steam through coil 38 until the phthalic acid melts and then decomposes with elimination of water. Meanwhile additional phthalic acid discharged by the drum filter is collected in bin 36.

During this period the valves on pipes 43 and 43' are kept closed and the valve 40 on pipe 14 is maintained open so that water vapor, together with any phthalic acid or anhydride which it contains, passes from still 37 up through pipe 14 into condenser 11. Since outlet 13 of condenser 11 is open to the atmosphere, the still is maintained at about atmospheric pressure. The vapors coming into contact with the scrubbing liquid cascading through condenser 11 are washed and cooled, and any phthalic acid or anhydride is collected by the scrubbing liquid and carried to flash tank 16.

When the temperature in the still 37 rises appreciably above 190° C. at atmospheric pressure, valve 40 on pipe 14 is closed, the valves on pipes 43 and 43' are opened and suction is applied at vacuum connection 44 to maintain an absolute pressure of around 1.7 pounds per square inch in column 41. A cooling fluid is introduced into the cooling section 42 of the column. This cooling section may constitute a waste heat boiler arranged to effect production of steam by the heat of the phthalic anhydride vapors. The temperature at the top of the column may be controlled by the pressure of steam generated and preferably is maintained at about 200° C. When a sufficient quantity of reflux liquid has been generated in the still to insure sharp fractionation, the valve on outlet 45 is opened to permit passage of liquid phthalic anhydride product therethrough and into the dip pan of flaker 46. Withdrawal through outlet 45 is regulated so as to maintain adequate reflux fluid in the column during distillation. Cooling fluid is introduced into the drum of the flaking machine which is put in rotation to pick up the liquid phthalic anhydride from the dip pan, solidify it, and discharge it into the storage vessel 50. Residue from the phthalic anhydride distillation may be withdrawn through outlet 39 of still 37.

In Fig. 2 a somewhat different arrangement of cooler and separator for removal of phthalic acid from the scrubbing liquid is shown. In the operation of the embodiment shown in Fig. 2, the slurry or solution from condenser 11 is passed via pipe 15 to a heat exchanger 51 where it is cooled by indirect heat exchange with a suitable cooling fluid, such as water. The cooled solution now containing the phthalic acid mainly as a slurry, passes into settling tank 52 wherein the phthalic acid settles out. Supernatant liquid is withdrawn through outlet 53 by pump 54 and is returned via pipes 19 and 20 to the scrubber 6. The solid phthalic acid containing considerable water mixed therewith is withdrawn from settling tank 52 through pipe 55 to a separator 56, e. g. a drum filter or a centrifugal separator, where remaining water is separated. The resultant phthalic acid may be withdrawn at 57 and conducted to the phthalic acid still. The scrubbing liquid separated from phthalic acid is withdrawn from the separator through pipe 58 and, after bleeding off a portion through outlet 59, the remainder by means of pump 60, is returned through pipe 61 to settling tank 52.

It will be understood that with a substantial proportion of water vapor in the gases, more or less of the maleic or phthalic anhydrides may be present in the form of acid especially if the gases are cooled to a temperature approaching the dewpoint for these constituents prior to the direct contact cooling step above described. Hence my invention comprehends recovery of acid as well as anhydride by the method described.

I claim:

1. The method of removing the phthalic anhydride product from the hot gases resulting from the vapor phase partial oxidation of polynuclear aromatic compounds, which comprises bringing a stream of the hot reaction gases, while yet at a temperature above the condensation temperature of phthalic acid or anhydride in solid phase, into intimate contact with water to simultaneously cool the gases and remove phthalic anhydride therefrom.

2. The method of removing the phthalic anhydride product from the hot reaction gases resulting from the vapor phase partial oxidation of polynuclear aromatic compounds, which comprises bringing a stream of the hot reaction gases while yet at a temperature above about 135° C. into contact with water to simultaneously cool the gases and remove phthalic anhydride therefrom.

3. The method of removing the phthalic anhydride product from the hot gases resulting from the vapor phase partial oxidation of polynuclear aromatic compounds, which comprises bringing a stream of the hot reaction gases, while yet at a temperature above the dewpoint of phthalic acid or anhydride, into intimate contact with cooling water substantially saturated with phthalic acid to simultaneously cool the gases and remove the phthalic anhydride therefrom as an aqueous phthalic acid slurry.

4. The method of recovering phthalic anhydride from the hot reaction gases resulting from the vapor phase partial oxidation of polynuclear aromatic compounds, which comprises cooling the hot reaction gases in an indirect heat exchanger to a temperature around 200° C., passing the partially cooled gases into intimate contact with cooling water to reduce the temperature of the gases down to around 40° C. and to separate phthalic anhydride therefrom as an aqueous phthalic acid slurry.

5. The method of removing the phthalic anhydride product from the hot reaction gases resulting from the vapor phase partial oxidation of polynuclear aromatic compounds, which comprises bringing a stream of the hot reaction gases while yet at a temperature above the condensation temperature of phthalic anhydride in solid phase into intimate contact with cooling water to simultaneously cool the gases and separate phthalic anhydride as an aqueous phthalic acid slurry, withdrawing the aqueous slurry from contact with the gases, separating phthalic acid therefrom, and circulating the residual liquid into contact with further hot reaction gases for the recovery of additional quantities of phthalic anhydride.

6. The method of removing the phthalic anhydride product from the hot reaction gases resulting from the vapor phase partial oxidation of polynuclear aromatic compounds, which comprises bringing the gases into intimate contact with cooling water whereby the gases are cooled to condense phthalic anhydride and form a warm, aqueous phthalic acid slurry with the cooling water, withdrawing and cooling the resultant warm slurry of phthalic acid, and separating phthalic acid from the cooled liquid.

7. The method of removing the phthalic anhydride product from the hot reaction gases resulting from the vapor phase partial oxidation of polynuclear aromatic compounds, which comprises bringing the gases into intimate contact with cooling water whereby the gases are cooled to condense phthalic anhydride and form a warm, aqueous phthalic acid solution with the cooling water, withdrawing and cooling the resultant warm solution of phthalic acid to precipitate phthalic acid, and separating phthalic acid from the cooled liquid.

8. The method of removing the phthalic anhydride product from the hot reaction gases resulting from the vapor phase partial oxidation of polynuclear aromatic compounds, which comprises bringing the gases into intimate contact with cooling water whereby the gases are cooled to condense phthalic anhydride and form a warm aqueous phthalic acid solution with the cooling water, withdrawing and cooling the resultant warm solution of phthalic acid to precipitate phthalic acid, separating phthalic acid from the cooled liquid, and returning at least a portion of the cooled liquid into contact with further quantities of hot reaction gases.

9. The method of recovering the phthalic anhydride product from the hot reaction gases resulting from the vapor phase partial oxidation of polynuclear aromatic compounds, which comprises bringing the gases into intimate contact with cooling water whereby the gases are cooled to condense phthalic anhydride and form an aqueous phthalic acid slurry with the cooling water, separating phthalic acid from the liquid, and heating the resultant phthalic acid to drive off water therefrom and form phthalic anhydride.

10. The method of recovering the phthalic anhydride product from the hot reaction gases resulting from the vapor phase partial oxidation of polynuclear aromatic compounds, which comprises bringing the hot gases into intimate contact with cooling water whereby the gases are cooled to condense phthalic anhydride and form a warm, aqueous phthalic acid solution with the cooling water, withdrawing and cooling the warm solution of phthalic acid to precipitate phthalic acid, separating phthalic acid from the cooled liquid, and heating the resultant phthalic acid to drive off water therefrom and form phthalic anhydride.

11. The method of recovering the phthalic anhydride product from the hot reaction gases resulting from the vapor phase partial oxidation of polynuclear aromatic compounds, which comprises bringing the hot gases into intimate contact with cooling water whereby the gases are cooled to condense phthalic anhydride and form an aqueous phthalic acid slurry with the cooling water, separating phthalic acid from the liquid, heating the resultant phthalic acid to drive off water therefrom and form phthalic anhydride, and washing the resultant vapors with the cooling liquid to recover phthalic acid therefrom.

12. The method of recovering the phthalic anhydride product from the hot reaction gases resulting from the vapor phase partial oxidation of polynuclear aromatic compounds, which comprises bringing the hot gases into intimate contact with cooling water whereby the gases are cooled to condense phthalic anhydride and form a warm, aqueous phthalic acid solution with the cooling water, withdrawing and cooling the warm solution of phthalic acid to precipitate phthalic acid, separating phthalic acid from the cooled liquid, heating the resultant phthalic acid to drive off water therefrom and form phthalic anhydride, and washing the resultant vapors with the cooling liquid to recover phthalic acid therefrom.

13. The method of effecting removal of the maleic anhydride from the reaction gases resulting from the vapor phase partial oxidation of polynuclear aromatic compounds, which comprises scrubbing the gases with an aqueous liquid while they are at a pressure between 2 and 5 atmospheres absolute.

14. The method of effecting simultaneous removal of the phthalic anhydride product and maleic anhydride from the hot reaction gases resulting from the vapor phase partial oxidation of polynuclear aromatic compounds, which comprises bringing a stream of the hot reaction gases while yet at a temperature above the condensation temperature of phthalic anhydride and while at a pressure between 2 and 5 atmospheres absolute into contact with cooling water to simultaneously cool the gases and separate phthalic and maleic anhydrides therefrom.

RALPH LYMAN BROWN.